(12) United States Patent
Izumikawa

(10) Patent No.: US 10,920,403 B2
(45) Date of Patent: Feb. 16, 2021

(54) SHOVEL

(71) Applicant: SUMITOMO(S.H.I.) CONSTRUCTION MACHINERY CO., LTD., Tokyo (JP)

(72) Inventor: Takeya Izumikawa, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 152 days.

(21) Appl. No.: 16/203,890

(22) Filed: Nov. 29, 2018

(65) Prior Publication Data
US 2019/0093317 A1 Mar. 28, 2019

Related U.S. Application Data

(63) Continuation of application No. PCT/JP2017/024123, filed on Jun. 30, 2017.

(30) Foreign Application Priority Data

Jul. 5, 2016 (JP) .................... 2016-133409

(51) Int. Cl.
E02F 9/24 (2006.01)
H04N 7/18 (2006.01)
G08G 1/16 (2006.01)
G06K 9/00 (2006.01)
G06T 11/00 (2006.01)
(Continued)

(52) U.S. Cl.
CPC .............. *E02F 9/24* (2013.01); *B60R 1/00* (2013.01); *B60R 11/02* (2013.01); *E02F 3/435* (2013.01); *E02F 9/123* (2013.01); *E02F 9/2033* (2013.01); *E02F 9/261* (2013.01); *E02F 9/262* (2013.01); *G06K 9/00771* (2013.01); *G06K 9/00791* (2013.01); *G06T 11/00* (2013.01); *B60R 2300/303* (2013.01); *B60R 2300/307* (2013.01);
(Continued)

(58) Field of Classification Search
CPC .... E02F 9/24; H04N 7/18; B60Q 1/00; G08G 1/16; G06F 3/041; G01B 11/14; G01S 13/00; G06K 9/00
See application file for complete search history.

(56) References Cited

U.S. PATENT DOCUMENTS 9,113,047 B2 8/2015 Onuma et al.
2009/0096661 A1* 4/2009 Sakamoto ............. G01S 13/345
342/92
(Continued)

FOREIGN PATENT DOCUMENTS

JP 2008282067 A * 11/2008 ............... G08G 1/16
JP 2010-198519 9/2010
(Continued)

OTHER PUBLICATIONS

International Search Report for PCT/JP2017/024123 dated Sep. 12, 2017.

Primary Examiner — Yuri Kan
(74) Attorney, Agent, or Firm — IPUSA, PLLC

(57) ABSTRACT

A shovel includes a lower traveling body, an upper turning body turnably mounted on the lower traveling body, an image capturing device attached to the upper turning body, and a display device. The operating condition of an object detecting function using the image capturing device is displayed on the display device.

20 Claims, 12 Drawing Sheets

(51) Int. Cl.
*B60R 11/02* (2006.01)
*E02F 3/43* (2006.01)
*E02F 9/12* (2006.01)
*B60R 1/00* (2006.01)
*E02F 9/26* (2006.01)
*E02F 9/20* (2006.01)

(52) U.S. Cl.
CPC ........ *B60R 2300/607* (2013.01); *H04N 7/188* (2013.01)

(56) References Cited

U.S. PATENT DOCUMENTS

| | | | |
|---|---|---|---|
| 2013/0088593 A1* | 4/2013 | Ishimoto | H04N 7/18 348/143 |
| 2013/0176120 A1* | 7/2013 | Shibamori | E02F 9/267 340/438 |
| 2013/0222573 A1* | 8/2013 | Onuma | E02F 9/24 348/82 |
| 2014/0267731 A1 | 9/2014 | Izumikawa | |
| 2014/0340498 A1* | 11/2014 | Plagemann | G06F 3/017 348/77 |
| 2015/0205398 A1* | 7/2015 | Le | G06T 11/203 345/173 |
| 2015/0326829 A1* | 11/2015 | Kurihara | G01S 13/931 348/148 |
| 2016/0364620 A1* | 12/2016 | Akiyama | G06K 9/00791 |
| 2017/0083760 A1 | 3/2017 | Kiyota | |
| 2017/0107698 A1 | 4/2017 | Yamaguchi et al. | |

FOREIGN PATENT DOCUMENTS

| | | |
|---|---|---|
| JP | 2014-225803 | 12/2014 |
| JP | 2015-055095 | 3/2015 |
| JP | 2015-153295 | 8/2015 |
| WO | 2012/053105 | 4/2012 |
| WO | 2015/162800 | 10/2015 |
| WO | 2015/186588 | 12/2015 |
| WO | 2016/013691 | 1/2016 |

* cited by examiner

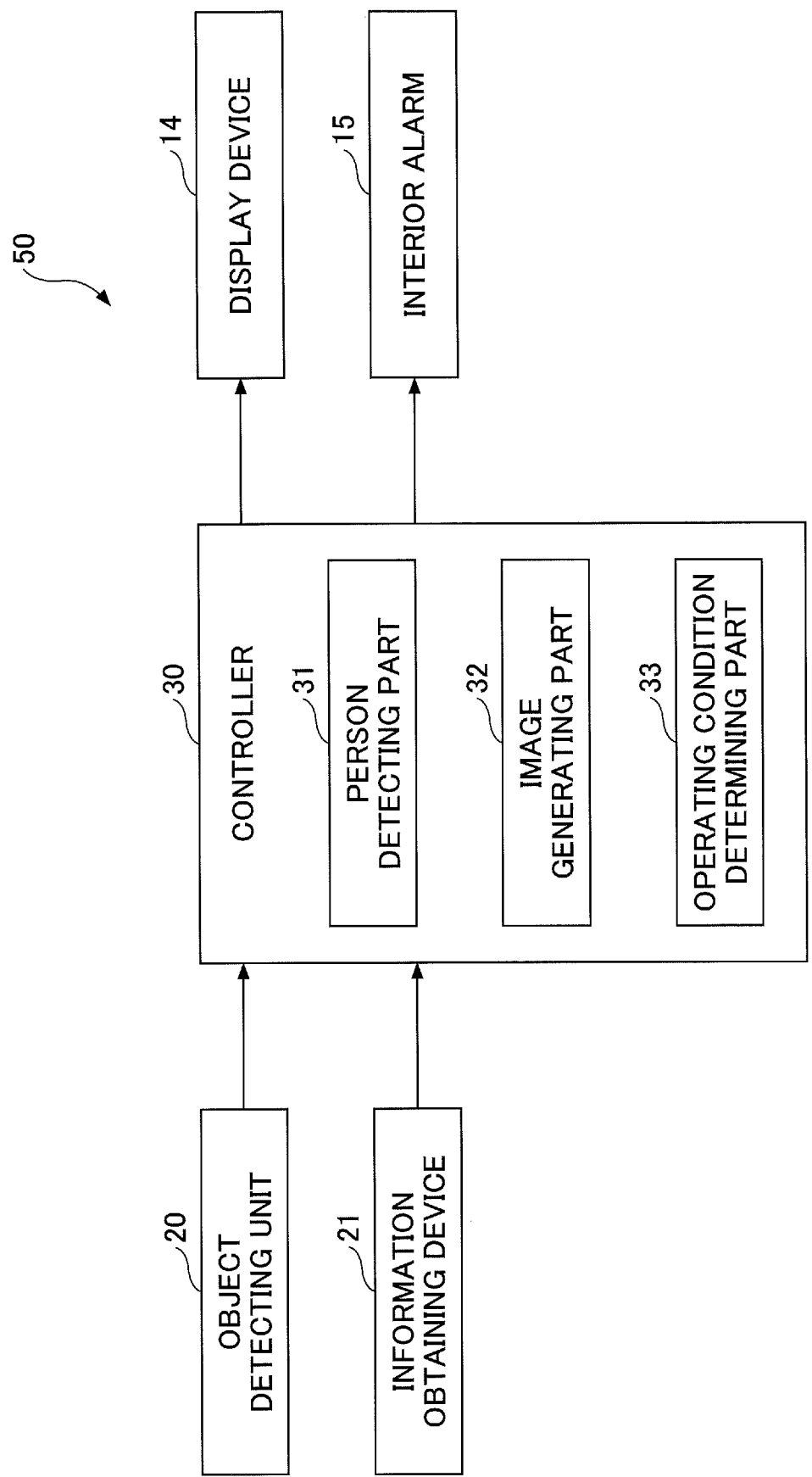

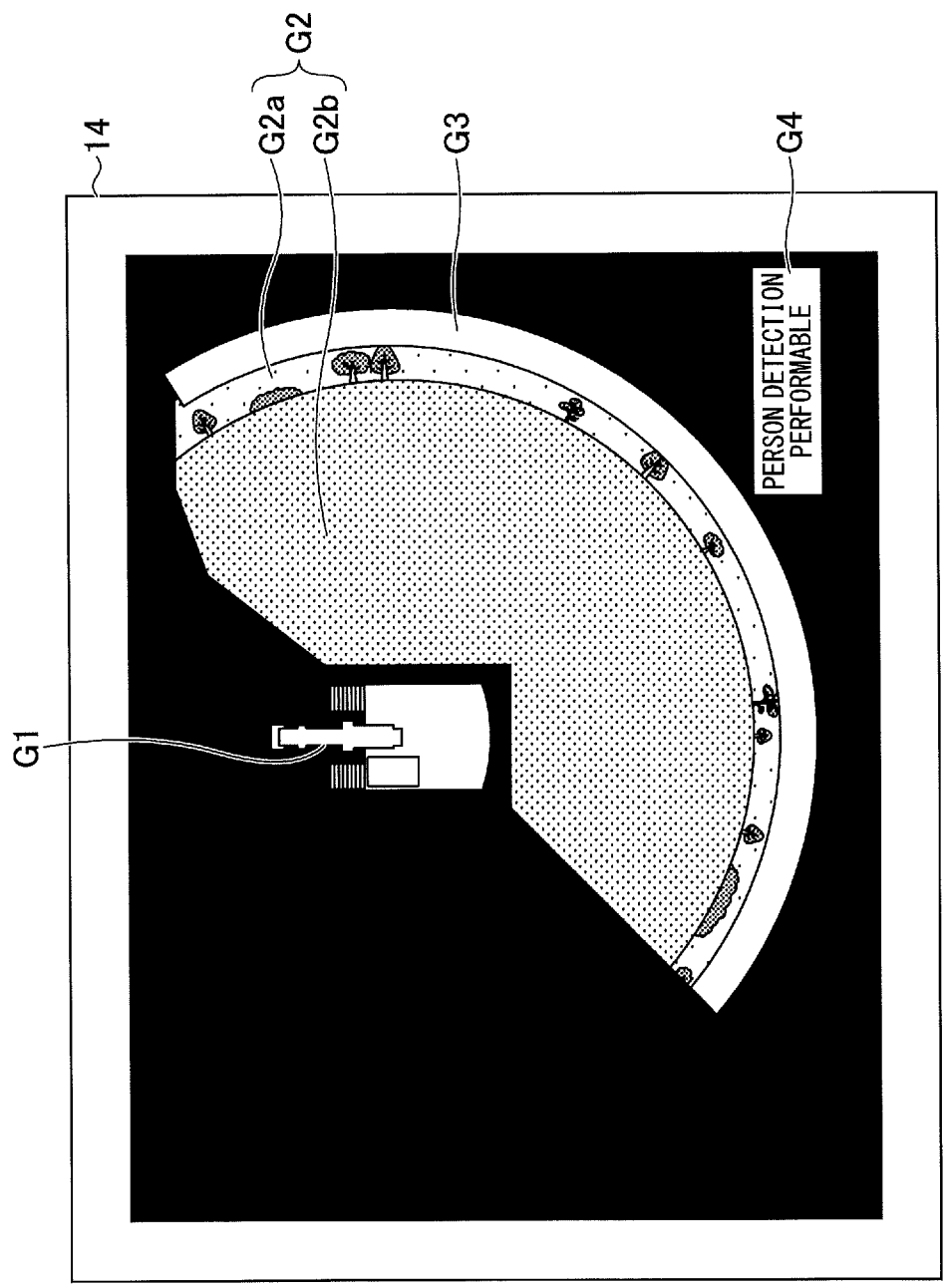

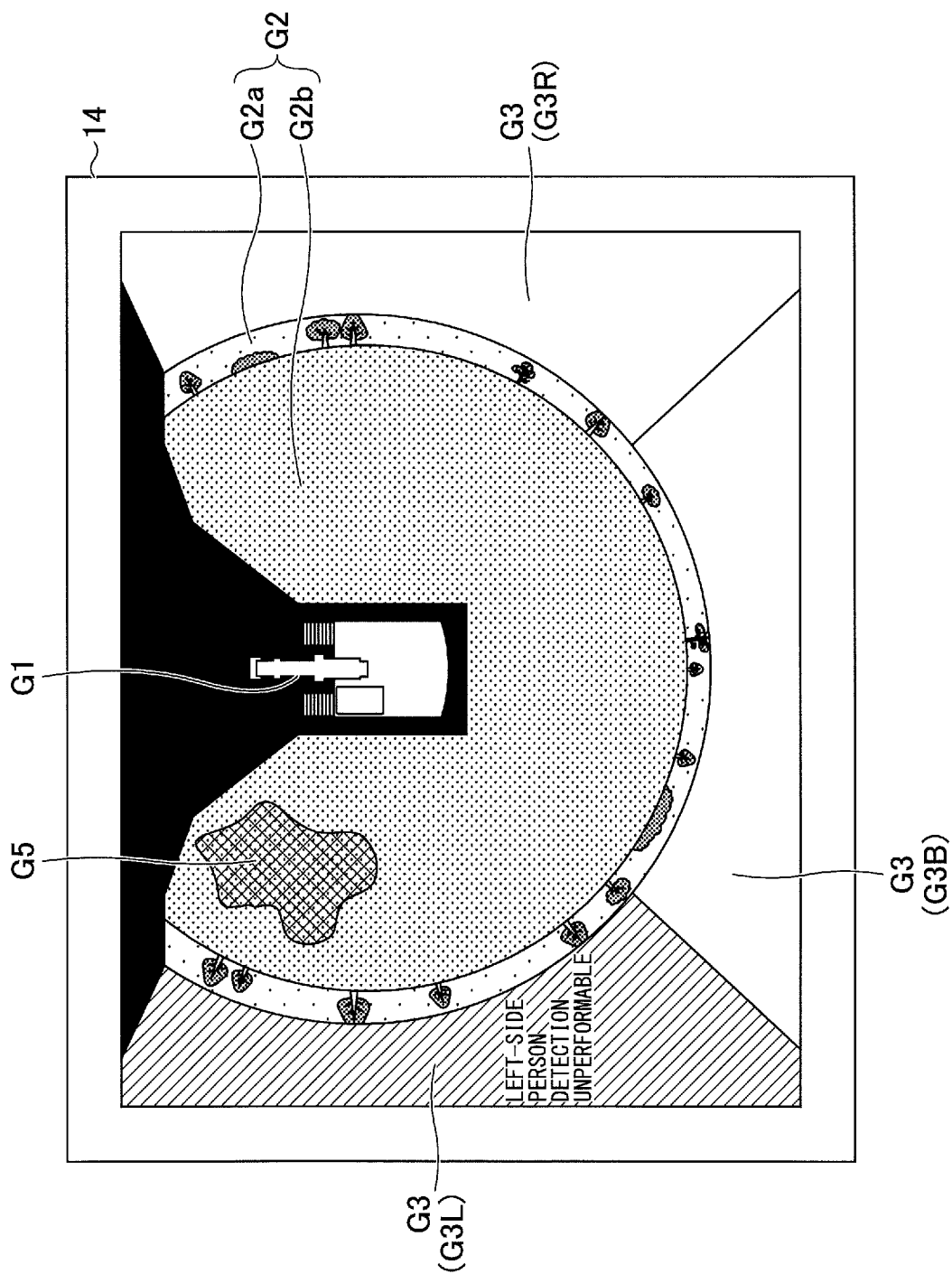

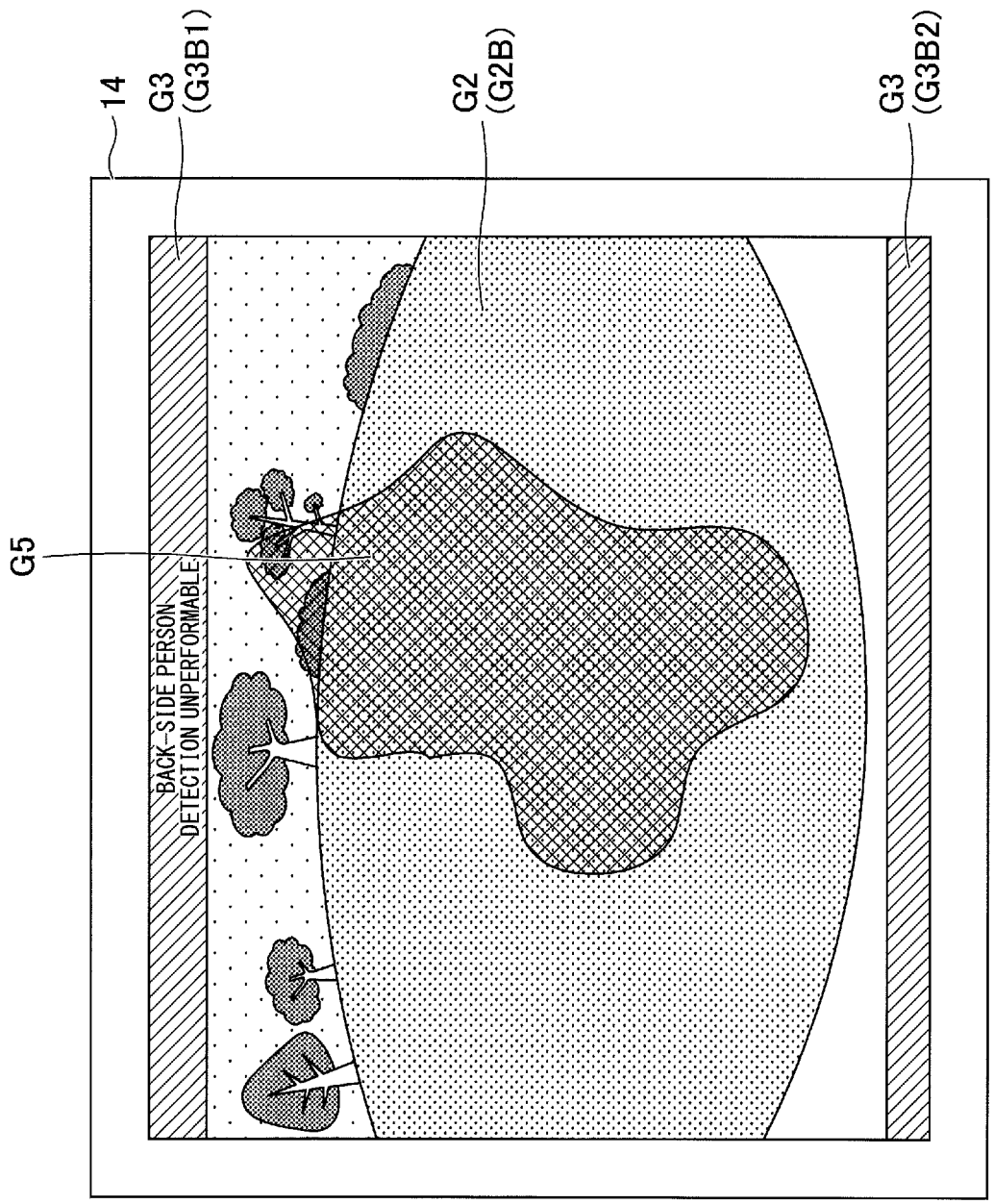

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2017/024123, filed on Jun. 30, 2017 and designating the U.S., which claims priority to Japanese patent application No. 2016-133409, filed on Jul. 5, 2016. The entire contents of the foregoing applications are incorporated herein by reference.

BACKGROUND

Technical Field

The present invention relates to shovels capable of detecting an object in the surroundings.

Description of Related Art

A shovel with a person detecting function to detect a person around the shovel based on the output a camera attached to the shovel is known. This shovel outputs an alarm to an operator of the shovel in response to determining the presence of a person image in an image captured with the camera.

SUMMARY

According to an aspect of the present invention, a shovel includes a lower traveling body, an upper turning body turnably mounted on the lower traveling body, an image capturing device attached to the upper turning body, and a display device. The operating condition of an object detecting function using the image capturing device is displayed on the display device.

BRIEF DESCRIPTION OF THE DRAWINGS

FIG. 2 is a block diagram illustrating a configuration of a person detecting system installed in the shovel according to the embodiment of the present invention;

FIG. 4C is a diagram illustrating yet another example of the display of the output image;

FIG. 7 is a diagram illustrating yet another example of the display of the output image; and FIG. 8 is a diagram illustrating still another example of the display of the output image.

DETAILED DESCRIPTION

According to the related-art shovel, however, in the case where the person detecting function cannot be properly used, such as when the lens of the camera is dirty, it may be impossible to detect a person and output an alarm although the person is around the shovel. The operator of the shovel may understand the absence of an alarm output as the absence of a person around the shovel.

Therefore, it is desired to provide a shovel with an object detecting function to detect a predetermined object, such as a person detecting function, in which when it may be impossible to detect the predetermined object, it is possible to so inform an operator of the shovel.

According to an aspect of the present invention, it is possible to provide a shovel with an object detecting function in which when it may be impossible to detect a predetermined object, it is possible to so inform an operator of the shovel.

Figure 1A:
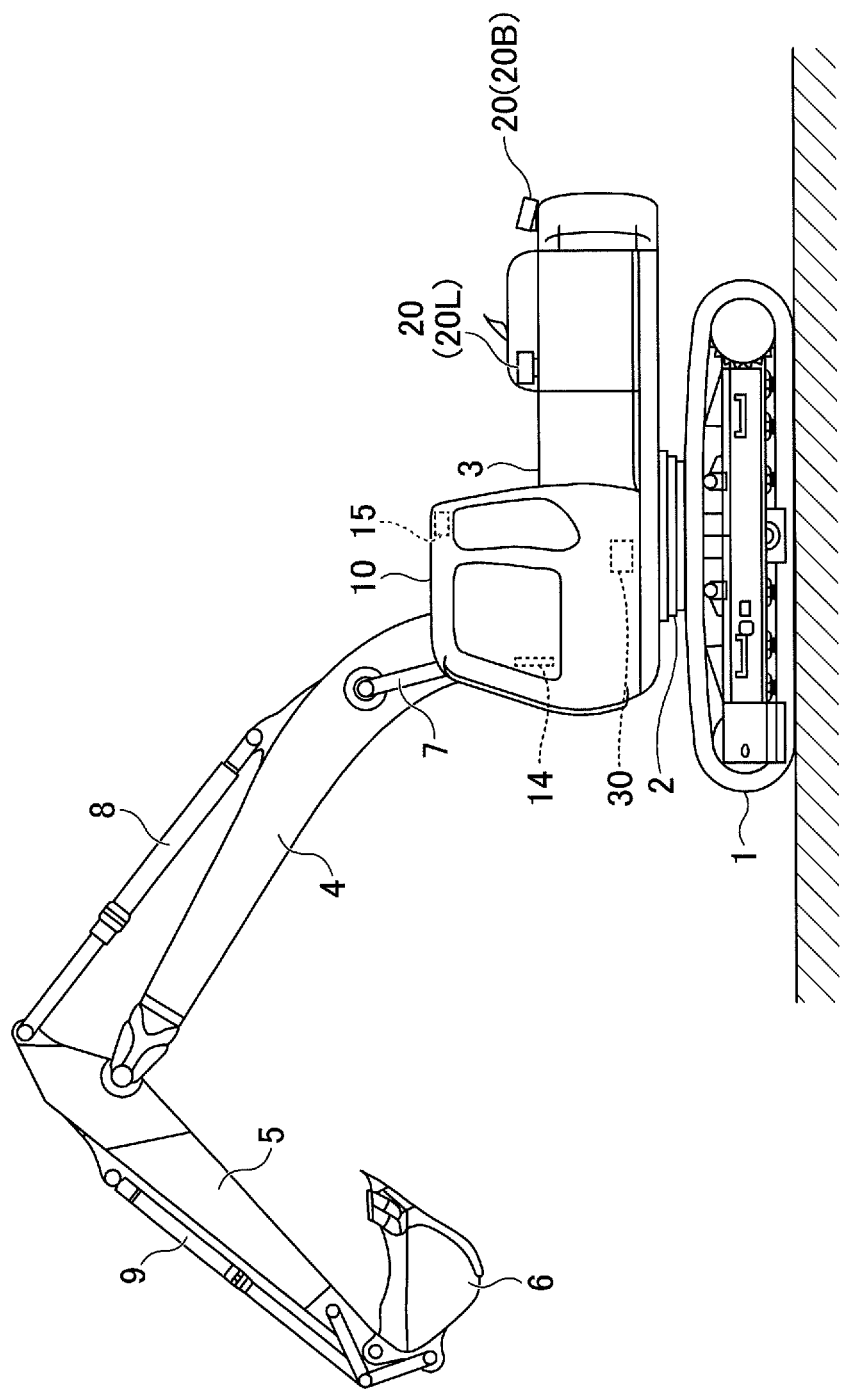
FIG. 1A is a side view of a configuration of a shovel according to an embodiment of the present invention.
Figure 1B:
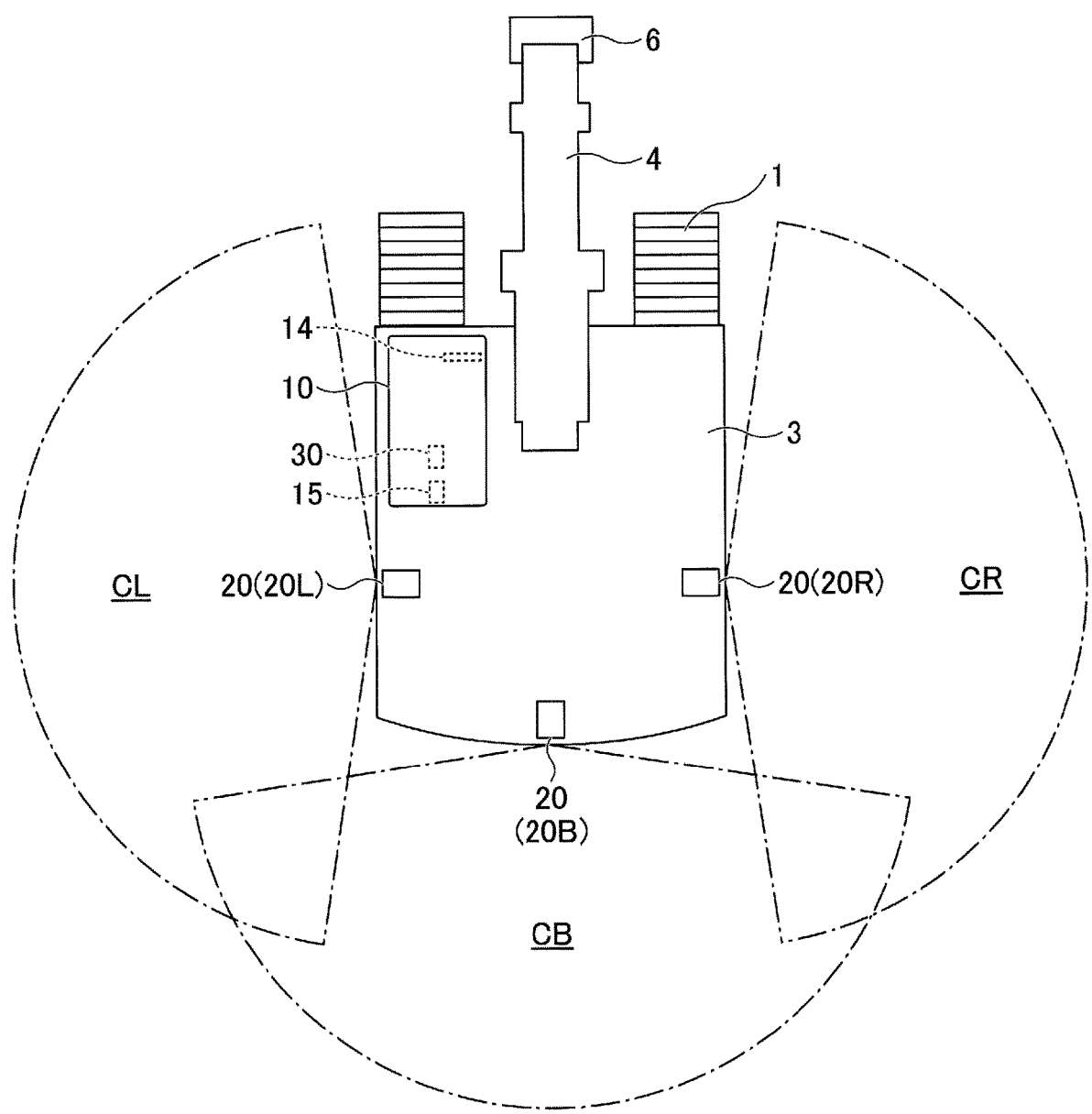
FIG. 1B is a plan view of the shovel of FIG. 1A.
Figure 1C:
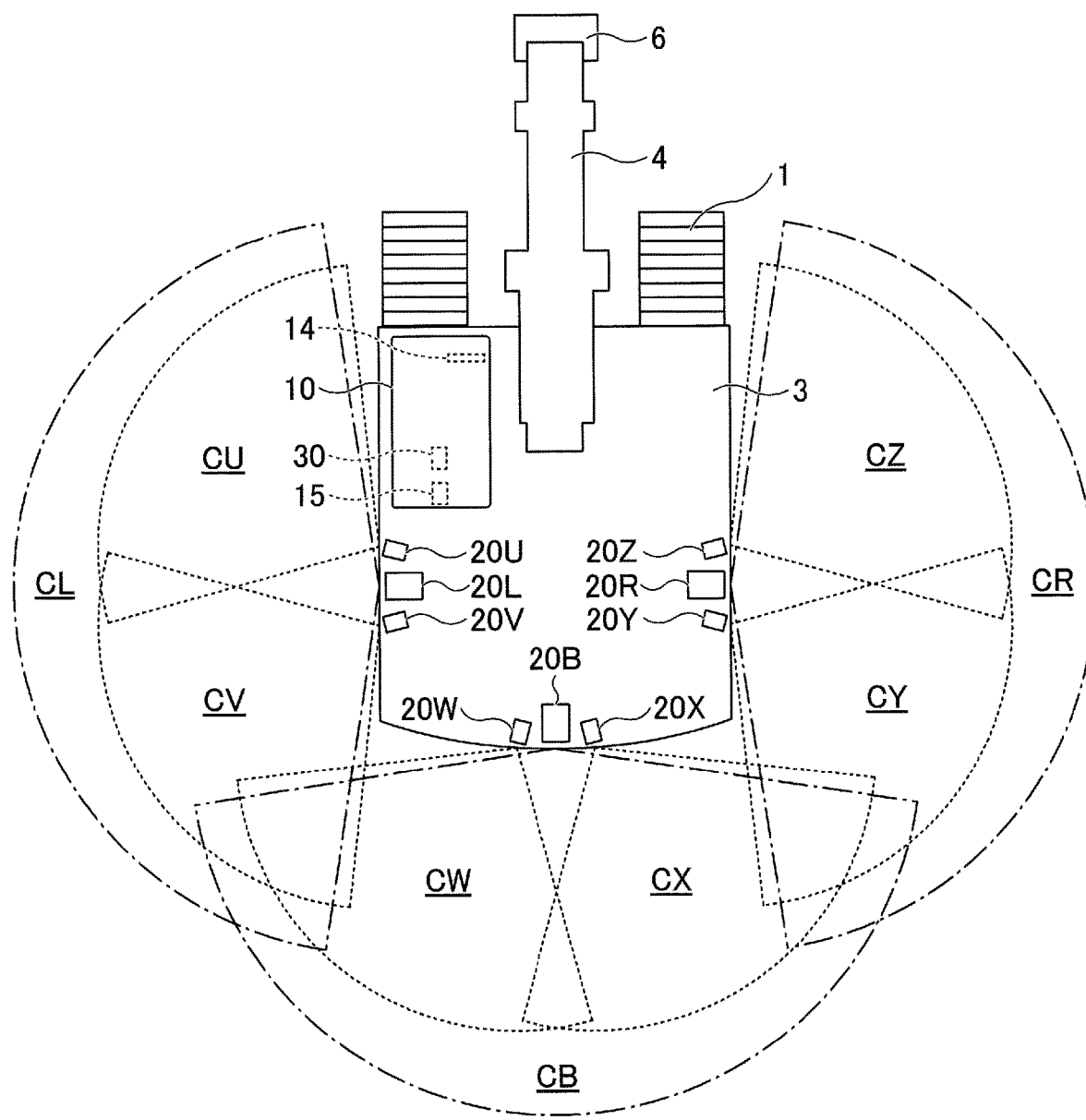
FIG. 1C is a plan view of another configuration of the shovel according to the embodiment of the present invention.

First, a shovel (an excavator) according to an embodiment of the present invention is described with reference to FIGS. 1A through 1C. FIG. 1A is a side view of the shovel, and FIG. 1B is a plan view of the shovel. FIG. 1C is a plan view of another configuration of the shovel.

As illustrated in FIGS. 1A and 1B, an upper turning body 3 is turnably mounted on a lower traveling body 1 of the shovel via a turning mechanism 2. A boom 4 is attached to the upper turning body 3. An arm 5 is attached to the end of the boom 4, and a bucket 6 is attached to the end of the arm 5. The boom 4, the arm 5, and the bucket 6 are hydraulically driven by a boom cylinder 7, an arm cylinder 8, and a bucket cylinder 9, respectively. A cabin 10 serving as a cab is provided and power sources such as an engine are mounted on the upper turning body 3. Furthermore, an object detecting unit 20 is attached to the upper turning body 3.

The object detecting unit 20 is a unit for detecting an object around the shovel. The object detecting unit 20 is, for example, an image capturing device (camera) for capturing an image of the surroundings of the shovel. The camera is composed of, for example, an imaging device such as a CCD or CMOS. In the case of FIGS. 1A and 1B, the object detecting unit 20 is composed of three monocular cameras attached to the upper surface of the upper turning body 3 so that the blind spots of an operator in the cabin 10 can be imaged. The three monocular cameras are a left camera 20L attached to the left end of the upper surface of the upper turning body 3, a right camera 20R attached to the right end of the upper surface of the upper turning body 3, and a back camera 20B attached to the back end of the upper surface of the upper turning body 3. FIG. 1B illustrates imaging ranges CL, CR and CB of the left camera 20L, the right camera 20R, and the back camera 20B with a one-dot chain line. The three monocular cameras are desirably attached to the upper turning body 3 in such a manner as not to project from the upper surface of the upper turning body 3 as illustrated in FIG. 1B. The left camera 20L may be omitted.

The object detecting unit 20 may alternatively be an ultrasonic sensor, a laser radar sensor, a millimeter wave sensor, a pyroelectric infrared sensor, a bolometer infrared sensor, an infrared camera or the like. In the case of FIG. 1C, the object detecting unit 20 is composed of three monocular cameras and six pyroelectric infrared sensors. The arrangement of the three monocular cameras is the same as the arrangement in FIG. 1B. The six pyroelectric infrared sensors are a first infrared sensor 20U and a second infrared sensor 20V attached to the left end of the upper surface of the upper turning body 3, a third infrared sensor 20W and a fourth infrared sensor 20X attached to the back end of the upper surface of the upper turning body 3, and a fifth infrared sensor 20Y and a sixth infrared sensor 20Z attached to the right end of the upper surface of the upper turning body 3. FIG. 1C illustrates detection ranges CU through CZ of the first infrared sensor 20U through the sixth infrared sensor 20Z with a dotted line. The six pyroelectric infrared sensors are desirably attached to the upper turning body 3 in such a manner as not to project from the upper surface of the upper turning body 3 as illustrated in FIG. 1C. In the case where the left camera 20L is omitted, the first infrared sensor 20U and the second infrared sensor 20V may be omitted.

As illustrated in FIGS. 1B and 1C, a display device 14, an interior alarm 15, a controller 30, etc., are installed in the cabin 10. The display device 14 is a device that displays various kinds of information, and is a liquid crystal display or an organic EL display, for example. The interior alarm 15 is a device that outputs an alarm to the operator in the cabin 10, and is composed of, for example, a buzzer, a loudspeaker, an LED lamp, or a seat vibrator installed in the cabin 10. The controller 30 is a computer including a CPU, a volatile storage device, and a nonvolatile storage device.

Here, an object detecting system 50 installed in the shovel according to the embodiment of the present invention is described with reference to FIG. 2. FIG. 2 is a block diagram illustrating a configuration of the object detecting system 50.

The object detecting system 50 is a system that detects an object entering a predetermined detection range set around the shovel, and is composed mainly of the display device 14, the interior alarm 15, the object detecting unit 20, an information obtaining device 21, the controller 30, etc. The object is, for example, a person, a vehicle, a work machine, an animal or the like. According to this embodiment, the object detecting system 50 detects a person.

According to the object detecting system 50 of FIG. 2, the controller 30 causes the CPU to execute programs corresponding one to each of functional elements such as a person detecting part 31, an image generating part 32, and an operating condition determining part 33 to implement functions corresponding to the functional elements.

The person detecting part 31 is a functional element to detect a person entering a predetermined detection range set around the shovel. In the case of FIG. 2, the person detecting part 31 determines the presence or absence of a person based on the output of a camera serving as a person detecting part and the object detecting unit 20. In this case, the person detecting part 31 detects a person based on an image shape, and therefore, can distinguish between objects other than persons, such as trees and buildings, and persons. The person detecting part 31 determines the presence or absence of a person within a predetermined detection range by identifying a person image in a captured image, using image features such as HOG features, for example. The person detecting part 31 may alternatively determine the presence or absence of a person within a predetermined detection range using other known image recognition techniques.

In this case, the predetermined detection range is a space included in the imaging range of a camera, for example. In the case of FIG. 2, the predetermined detection range is a space that can be reached by the teeth tips of the bucket 6 within a space included in the imaging range of a camera. The predetermined detection range may alternatively be a space corresponding to the imaging range of a camera or a space within a range of a predetermined distance from the turning axis of the shovel within a space included in the imaging range of a camera.

The predetermined detection range may be composed of multiple partial detection ranges. For example, the predetermined detection range may be composed of a combination of a left-side detection range to the left of the shovel, which is a space included in the imaging range CL of the left camera 20L, a back-side detection range at the back of the shovel, which is a space included in the imaging range CB of the back camera 20B, and a right-side detection range to the right of the shovel, which is a space included in the imaging range CR of the right camera 20R. Two adjacent partial detection ranges may be so disposed as to overlap each other, may adjoin each other without an overlap, or may be spaced apart from each other.

Alternatively, the person detecting part 31 may determine the presence or absence of a person within a predetermined detection range based on the output of an object detecting sensor such as an ultrasonic sensor, a laser radar sensor, a millimeter wave sensor, a pyroelectric infrared sensor, a bolometer infrared sensor, an infrared camera or the like serving as a person detecting part and the object detecting unit 20. For example, in the case of using the output of a pyroelectric infrared sensor, the person detecting part 31 determines the presence of a person within a detection range when an energy change within the detection range exceeds a predetermined threshold. In this case, the predetermined detection range may be a space corresponding to the detection range of the pyroelectric infrared sensor.

In response to detecting a person, the person detecting part 31 outputs a control command to the interior alarm 15 to activate the interior alarm 15 to inform an operator of the shovel of the detection of a person. In the case of FIG. 2, the person detecting part 31 activates a buzzer installed in the cabin 10.

The image generating part 32 is a functional element to generate an output image based on the output of a camera serving as the object detecting unit 20. In the case of FIG. 2, the image generating part 32 generates an output image based on input images captured by the back camera 20B, the left camera 20L, and the right camera 20R, and causes the generated output image to be displayed on the display device 14. The output image includes a camera image generated from one or more input images. For example, the camera image is generated by performing viewing transformation on a composite image of three input images. Furthermore, the camera image is, for example, a surrounding image showing the surroundings of the shovel viewed from above. For example, the area of the surrounding image is so determined as to extend along the periphery of a computer graphic (CG) image of the shovel with its outside outline drawing an arc. The area of the surrounding image may be determined such that its outside outline draws an arc of any curvature, may be determined such that its outside outline draws an elliptical arc, or may be determined such that its outside outline draws any convex curve. The output image may alternatively be a through-the-lens image showing the surroundings of the shovel viewed laterally. For example, the through-the-lens image shows a space at the back of the shovel viewed substantially horizontally from the shovel. The area of the through-the-lens image is determined such that its outside outline includes at least one rectilinear portion. For example, the area of the through-the-lens image may be determined such that its outside outline draws a square, a rectangle, a trapezoid or the like. The through-the-lens image may alternatively be a camera image generated without being subjected to viewing transformation.

The operating condition determining part 33 is a functional element to determine the operating condition of a person detecting function that is an example of an object detecting function. The operating condition of the person detecting function includes a detection-unperformable condition and a detection-performable condition.

The detection-unperformable condition means a condition in which it may be impossible to detect a person. Examples of the detection-unperformable condition include a low-visibility condition due to rain, fog or the like and a low-visibility condition due to insufficient illuminance in indoor work, night-time work or the like, and in the configuration of determining the presence or absence of a person based on the output of a camera serving as the object detecting unit 20, include a condition in which mud, snow or raindrops are adhering to the lens of the camera. Likewise, examples of the detection-unperformable condition include a condition in which mud, snow or raindrops are adhering to the light-emitting part or the light-receiving part of an infrared sensor in the configuration of determining the presence or absence of a person based on the output of an object detecting sensor serving as the object detecting unit 20, and include a high-noise condition due to high-intensity external radio waves in the configuration of determining the presence or absence of a person based on the output of a millimeter wave sensor.

The detection-performable condition means a condition in which it is possible to detect a person. In the case of FIG. 2, the operating condition determining part 33 determines that it is a detection-performable condition if not a detection-unperformable condition.

The operating condition of the person detecting function may include a condition other than the detection-unperformable condition and the detection-performable condition, such as a detection preparing condition in which the person detection function is being activated and is not ready for use.

The operating condition determining part 33 determines the operating condition of the person detecting function based on any available information. In the case of FIG. 2, the operating condition determining part 33 determines whether the operating condition of the person detecting function is a detection-unperformable condition based on an input image captured by a camera serving as the object detecting unit 20. Specifically, when determining that mud or the like is adhering to the lens by a known image recognition process, the operating condition determining part 33 determines that the operating condition of the person detecting function is a detection-unperformable condition. In the configuration of determining the presence or absence of a person based on the output of an object detecting sensor serving as the object detecting unit 20, the operating condition determining part 33 may determine the operating condition of the person detecting function based on the output of the object detecting sensor, for example. Specifically, when the output of the object detecting sensor is continuously maintained at or above a predetermined threshold for a predetermined time, the operating condition determining part 33 may determine that the operating condition of the person detecting function is a detection-unperformable condition. The operating condition determining part 33 may determine the operating condition of the person detecting function based on the output of an atmospheric pressure sensor, an air temperature sensor, an illuminance sensor, a humidity sensor, a positioning sensor or the like serving as the information obtaining device 21, or based on various kinds of information such as weather information received via a communications device serving as the information obtaining device 21.

Figure 3:
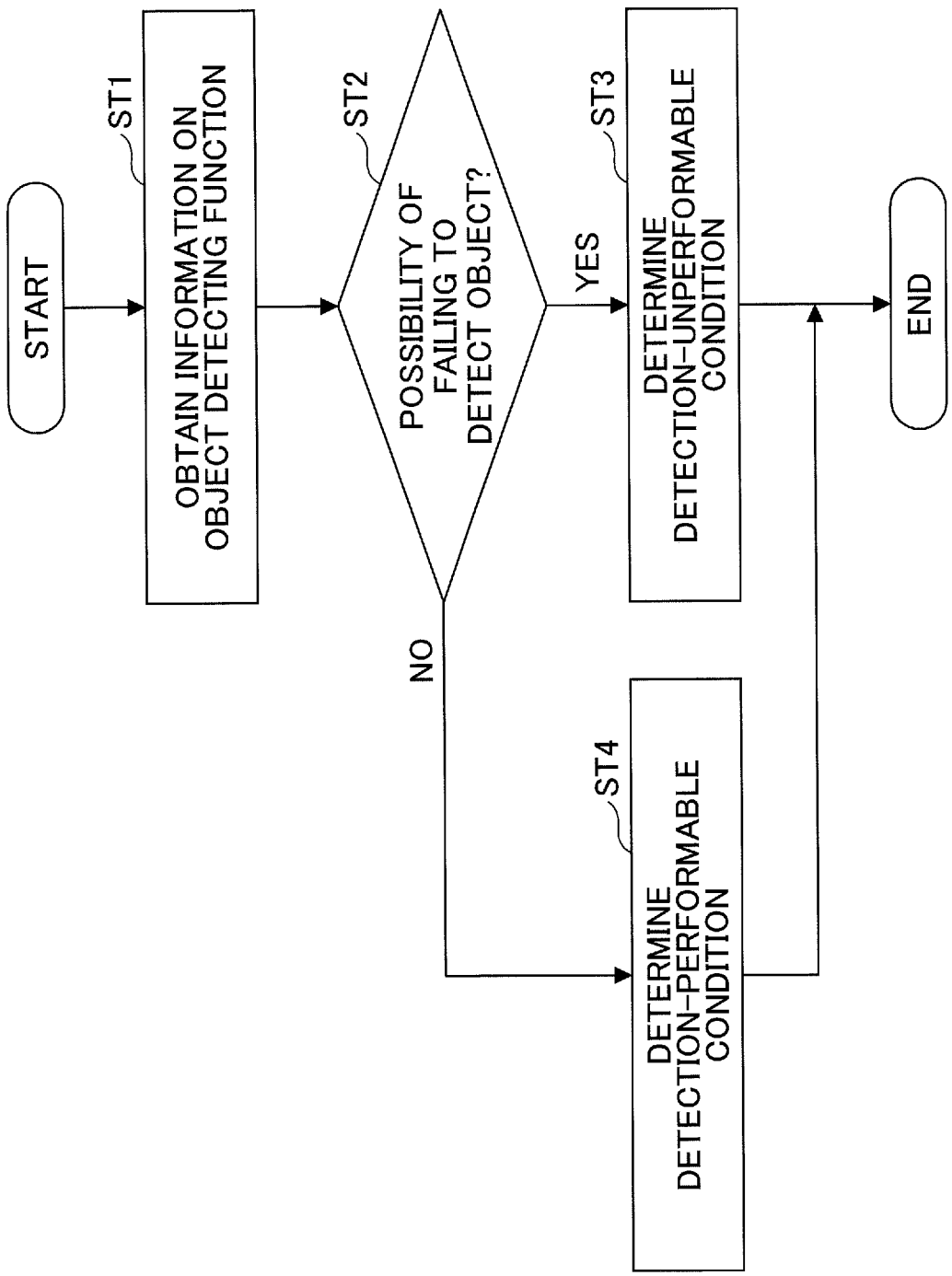
FIG. 3 is a flowchart of a condition determining process.

Here, a process of determining the operating condition of the object detecting function by the controller 30 (hereinafter, "condition determining process") is described with reference to FIG. 3. FIG. 3 is a flowchart of the condition determining process. The controller 30 repeatedly executes this process while the shovel is in operation.

First, the operating condition determining part 33 of the controller 30 obtains information on the object detecting function (step ST1). Examples of the information on the object detecting function include an input image captured by a camera serving as the object detecting unit 20, the output of an object detecting sensor serving as the object detecting unit 20, the output of an atmospheric pressure sensor, an air temperature sensor, an illuminance sensor, a humidity sensor, a positioning sensor or the like serving as the information obtaining device 21, and weather information received via a communications device serving as the information obtaining device 21.

Thereafter, the operating condition determining part 33 determines whether it may be impossible to detect an object (step ST2). For example, the operating condition determining part 33 determines that it may be impossible to detect an object in the case of low visibility due to rain, fog or the like or in the case of low visibility due to insufficient illuminance in indoor work, night-time work or the like. In the configuration of determining the presence or absence of an object based on the output of a camera, the operating condition determining part 33 determines that it may be impossible to detect an object when mud, snow or raindrops are adhering to the lens of the camera, for example. In the configuration of determining the presence or absence of an object based on the output of an object detecting sensor, the operating condition determining part 33 determines that it may be impossible to detect an object when mud, snow or raindrops are adhering to the light-emitting part or the light-receiving part of an infrared sensor, for example. In the configuration of determining the presence or absence of an object based on the output of a millimeter wave sensor, the operating condition determining part 33 determines that it may be impossible to detect an object in the case of high noise due to high-intensity external radio waves.

In response to determining that it may be impossible to detect an object (YES at step ST2), the operating condition determining part 33 determines that the operating condition of the object detecting function is a detection-unperformable condition (step ST3).

In response to determining that there is no possibility of failing to detect an object (NO at step ST2), that is, in response to determining that it is possible to detect an object, the operating condition determining part 33 determines that the operating condition of the object detecting function is a detection-performable condition (step ST4).

Thus, the controller 30 repeatedly executes the determination of the operating condition of the object detecting function while the shovel is in operation.

Furthermore, the operating condition determining part 33 displays the operating condition of the object detecting function in such a manner as to make it possible for the operator of the shovel to distinguish between operating conditions. For example, the operating condition determining part 33 displays a current operating condition of the object detecting function such that the operator can recognize the current operating condition by changing the mode of display of an operating condition display area indicating the operating condition of the person detecting function in accordance with the current operating condition. Specifically, the operating condition determining part 33 displays a current operating condition of the object detecting function using the operating condition display area characterized by differing in color representing the operating condition of the person detecting function. For example, the operating condition display area is displayed over an output image generated by the image generating part 32. For example, the operating condition display area is filled with a first color (for example, red) when the operating condition of the person detecting function is a detection-unperformable condition, and is filled with a second color (for example, green) when the operating condition of the person detecting function is a detection-performable condition.

The operating condition of the person detecting function may alternatively be characterized by a difference in pattern. For example, the operating condition display area may be filled with a first pattern (for example, a dot pattern) of a first color (for example, red) when the operating condition of the person detecting function is a detection-unperformable condition, and be filled with a second pattern (for example, an oblique line pattern) of a second color (for example, green) when the operating condition of the person detecting function is a detection-performable condition. The first color and the second color may be the same color.

As yet another alternative, the operating condition of the person detecting function may be characterized by a difference between display and non-display. For example, the operating condition display area may be filled with a first color (for example, red) when the operating condition of the person detecting function is a detection-unperformable condition, and be hidden (a current display state may be maintained) when the operating condition of the person detecting function is a detection-performable condition.

As yet another alternative, the operating condition of the person detecting function may be characterized by a difference between lighting and blinking. For example, the operating condition display area may light up, being filled with a first color (for example, red), when the operating condition of the person detecting function is a detection-unperformable condition, and blink, being filled with a second color (for example, green), when the operating condition of the person detecting function is a detection-performable condition. The first color and the second color may be the same color.

As still another alternative, the operating condition of the person detecting function may be characterized by a difference in text (character information), icon image, etc. For example, the operating condition display area may display an icon image representing a detection-unperformable condition and text "DETECTION UNPERFORMABLE" when the operating condition of the person detecting function is a detection-unperformable condition, and display an icon image representing a detection-performable condition and text "DETECTION PERFORMABLE" when the operating condition of the person detecting function is a detection-performable condition. Either text or an icon image alone may be displayed.

The operating condition display area may be filled with a third color (for example, yellow) when the operating condition of the person detecting function is a detection preparing condition. Alternatively, the operating condition display area may be filled with a first pattern (for example, an oblique line pattern) of a first color (for example, red) when the operating condition of the person detecting function is a detection-unperformable condition, and be filled with a second pattern (for example, a dot pattern) of the first color (for example, red) when the operating condition of the person detecting function is a detection preparing condition. The same first color is used for the detection-unperformable condition and the detection preparing condition because it is common to the detection-unperformable condition and the detection preparing condition that it may be impossible to detect a person.

Thus, the operating condition determining part 33 displays a current operating condition of the object detecting function such that the operator can recognize the current operating condition by changing the mode of display (color, pattern, display/non-display, lighting/blinking, etc.) of the operating condition display area in accordance with the current operating condition.

Figure 4A:
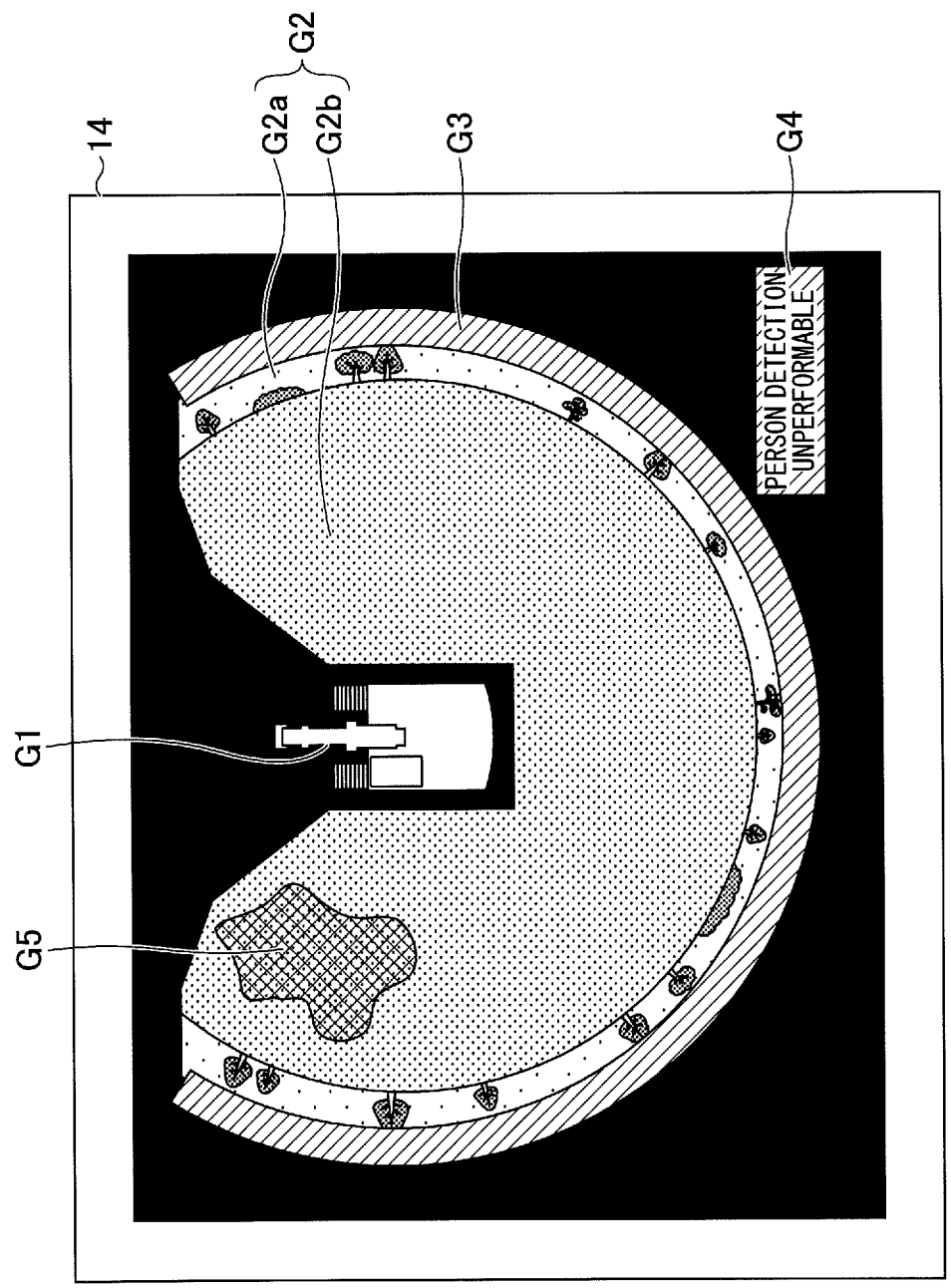
FIG. 4A is a diagram illustrating an example of display of an output image.
Figure 4B:
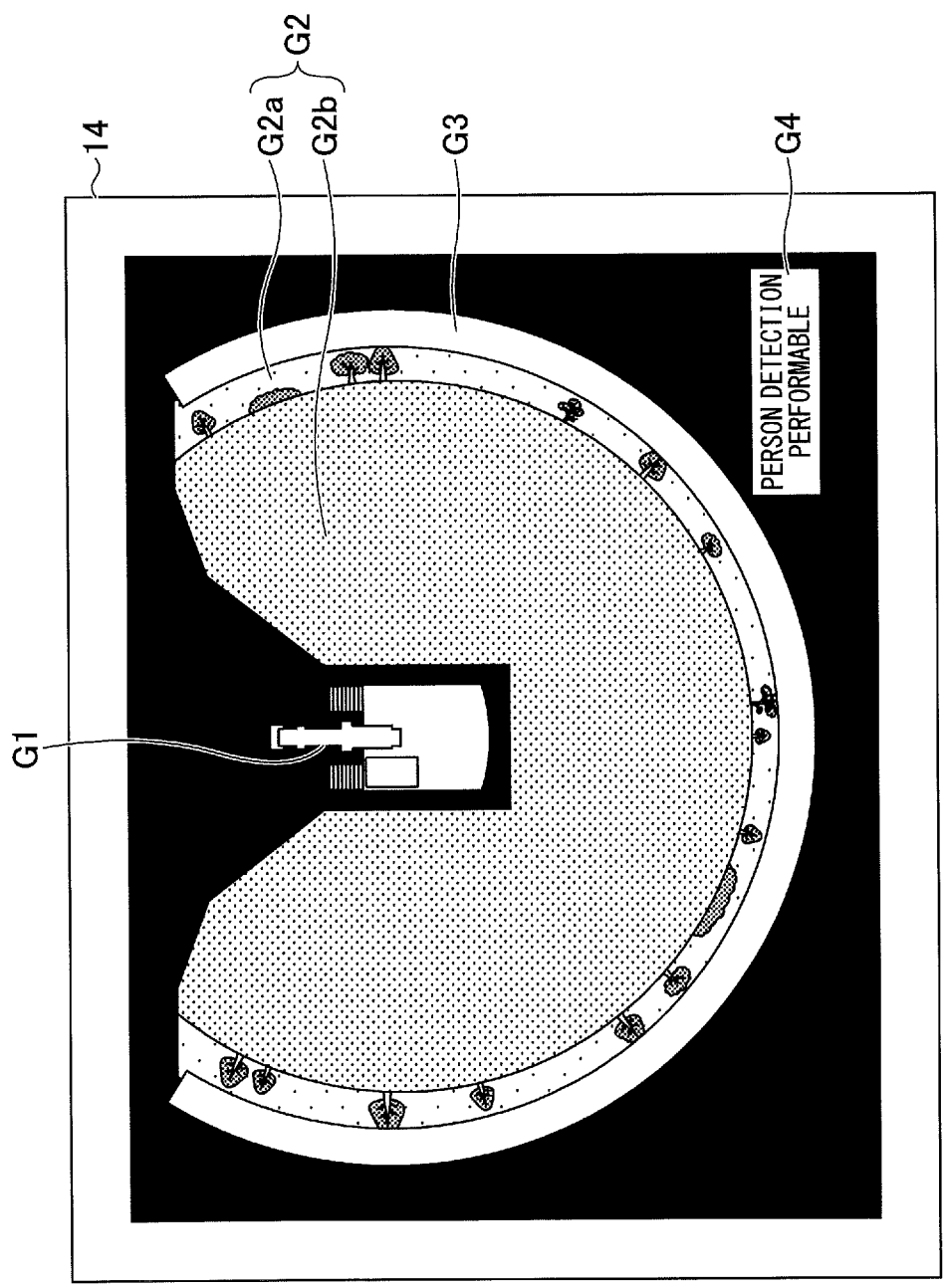
FIG. 4B is a diagram illustrating another example of the display of the output image.

Here, examples of the display of the operating condition of the person detecting function are described with reference to FIGS. 4A through 4C. FIG. 4A illustrates an example output image in the case where the person detecting function is a detection-unperformable condition, and FIG. 4B illustrates an example output image in the case where the person detecting function is a detection-performable condition. FIG. 4C illustrates another example output image in the case where the person detecting function is a detection-performable condition. FIGS. 4A through 4C illustrate output images displayed on the screen of the display device 14. The same is the case with FIGS. 5 through 8.

As illustrated in FIGS. 4A through 4C, an output image includes a CG image G1, a surrounding image area G2, an operating condition display area G3, and a text display area G4. The surrounding image area G2 includes a distant view image portion G2a and a near view image portion G2b. The distant view image portion G2a shows a distant view taken from a virtual viewpoint above the shovel. The near view image portion G2b shows a view of the nearby area of the shovel taken from a virtual viewpoint above the shovel.

The CG image G1 is a computer graphics image representing the shape of the shovel viewed from directly above. According to this embodiment, the CG image G1 is placed in the center of the output image.

In FIGS. 4A and 4B, the surrounding image area G2 is a camera image area where a surrounding image generated based on input images captured by the back camera 20B, the left camera 20L, and the right camera 20R is displayed. In FIG. 4C, the surrounding image area G2 is a camera image area where a surrounding image generated based on input images captured by the back camera 20B and the right camera 20R is displayed. According to this embodiment, the surrounding image area G2 is so placed as to extend along the CG image G1, and includes the near view image portion G2b of the nearby area of the shovel shown as if viewed from directly above and the distant view image portion G2a of a lateral distant view.

The operating condition display area G3 is an area where the operating condition of the person detecting function is shown, being characterized by color, and is placed along part of the outline of the surrounding image area G2. Specifically, in FIGS. 4A and 4B, the surrounding image area G2 is so placed as to form a partial circle of substantially 270 degrees extending on three sides, namely, the right side, the left side, and the back side, of the CG image G1. The operating condition display area G3 is so placed as to form an arc shape of substantially 270 degrees along the outside outline of the surrounding image area G2. In FIG. 4C, the surrounding image area G2 is so placed as to form a partial circle of substantially 180 degrees extending on two sides, namely, the right side and the back side, of the CG image G1. The operating condition display area G3 is so placed as to form an arc shape of substantially 180 degrees along the outside outline of the surrounding image area G2.

Furthermore, the positional relationship between the surrounding image area G2 and the operating condition display area G3 in the output image corresponds to the positional relationship between the shovel and the detection range of the object detecting system 50. For example, the length of the operating condition display area G3 along part of the outside outline of the surrounding image area G2 represents the width (for example, horizontal width) of the detection range, and the direction of the operating condition display area G3 viewed from the CG image G1 represents the direction of the detection range relative to the shovel. Alternatively, the direction of the operating condition display area G3 viewed from the center of the output image (the center of the surrounding image area G2 having the shape of a partial circle) represents the direction of the detection range relative to the shovel. In the examples illustrated in FIGS. 4A and 4B, the operating condition display area G3 of an arc shape of substantially 270 degrees covering the left, the back, and the right of the CG image G1 is displayed to indicate that a detection range of substantially 270 degrees in width is set on the left, the back, and the right of the shovel. In the example of FIG. 4C, the operating condition display area G3 of an arc shape of substantially 180 degrees covering the back and the right of the CG image G1 is displayed to indicate that a detection range of substantially 180 degrees in width is set on the back and the right of the shovel.

The operating condition display area G3 is desirably so displayed as not to overlap the surrounding image area G2 (the image portion of the nearby area of the shovel in particular). That is, the operating condition display area G3 is desirably at a position different from the surrounding image area G2. This is for preventing a camera image from becoming difficult to see or invisible at the overlap. Furthermore, the operating condition display area G3 is desirably so placed as to be displayed as large as possible in order that the operator of the shovel can easily recognize the operating condition of the person detecting function.

The text display area G4 is an area where various kinds of information are displayed in text. According to this embodiment, the text display area G4 is placed at the lower right corner of the output image and outside the operating condition display area G3, and displays the operating condition of the person detecting function in text. The text display area G4 may be displayed at another position such as the lower left corner of the output image or above the CG image G1. The text display area G4 may be either integrated into the operating condition display area G3 or omitted.

A contamination image G5 of FIG. 4A is an image of mud adhering to the lens of the left camera 20L. When it is determined that the person detecting function is a detection-unperformable condition because of the contamination image G5, the operating condition display area G3 and the text display area G4 are filled with red. The oblique line area in FIG. 4A represents being filled with red. Furthermore, when it is determined that the person detecting function is a detection-performable condition, the operating condition display area G3 and the text display area G4 are filled with green as illustrated in FIG. 4B. The white area in FIG. 4B represents being filled with green.

According to this configuration, the object detecting system 50 can cause the operator of the shovel to intuitively recognize that the detection range of the object detecting system 50 covers three sides, namely, the left side, the right side, and the back side, of the shovel, and can cause the operator of the shovel to instantaneously recognize whether the operating condition of the person detecting function is a detection-unperformable condition or a detection-performable condition.

Figure 5:
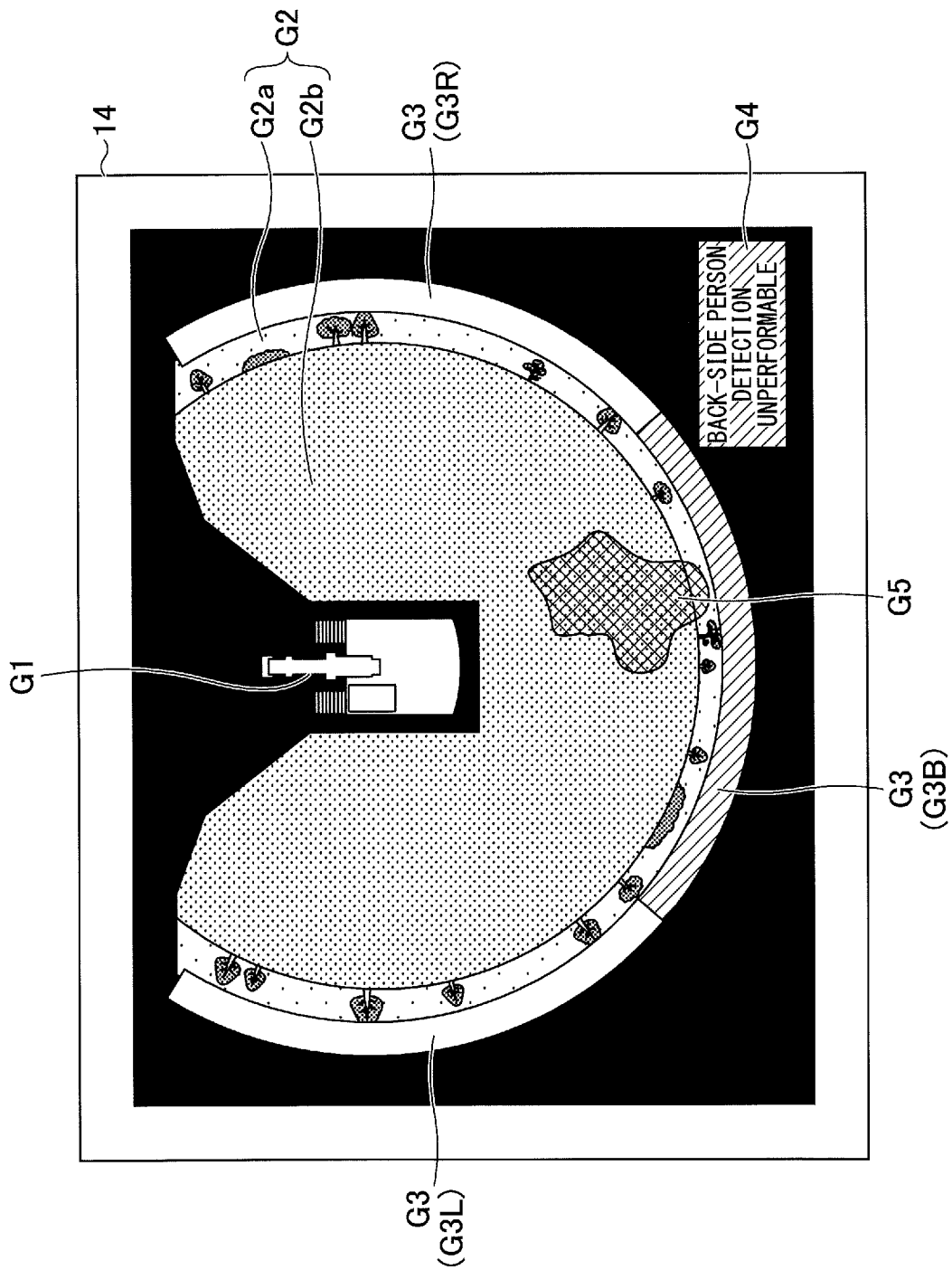
FIG. 5 is a diagram illustrating yet another example of the display of the output image.
Figure 6:
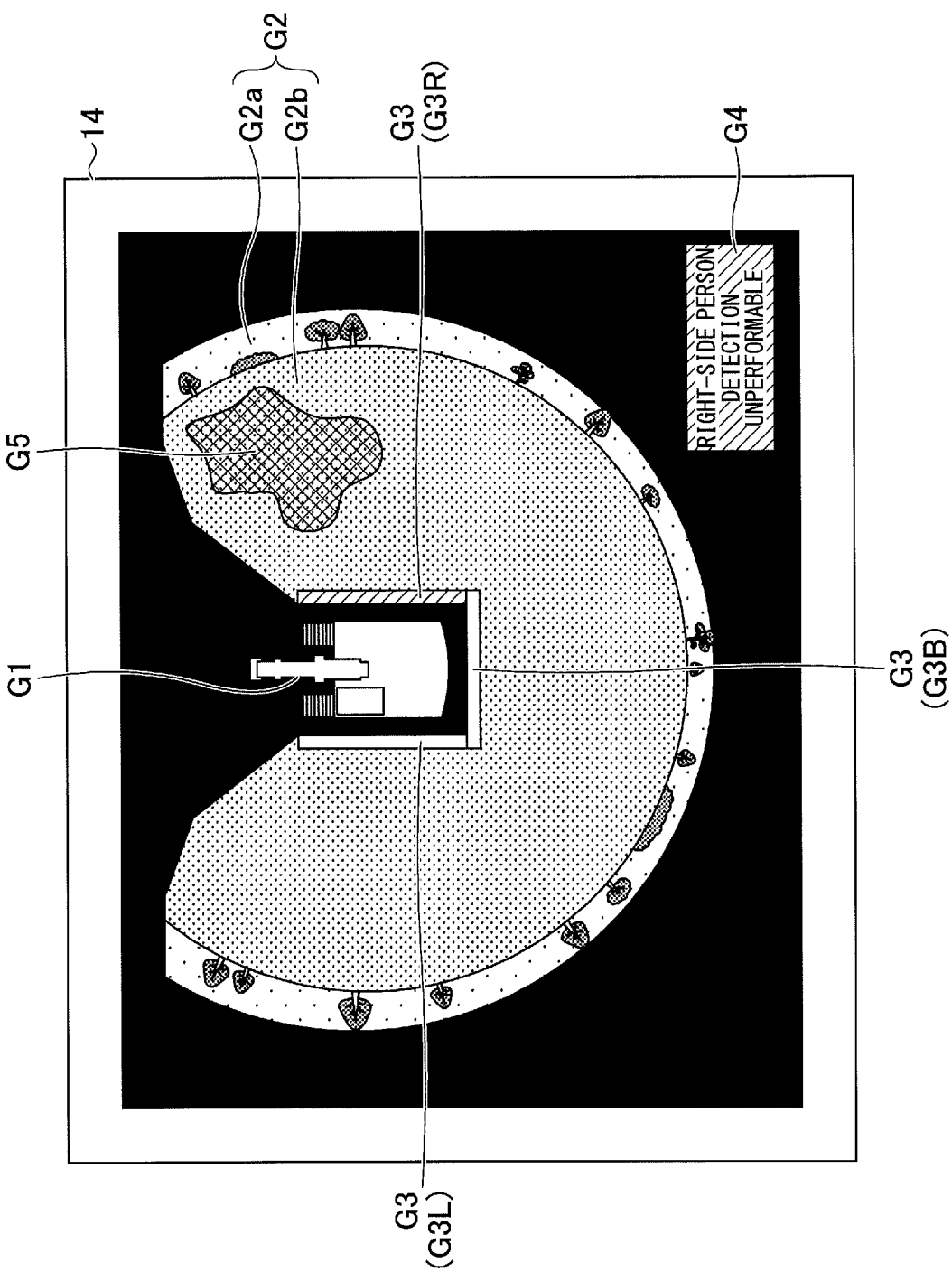
FIG. 6 is a diagram illustrating yet another example of the display of the output image.

Next, other examples of the display of the operating condition of the person detecting function are described with reference to FIGS. 5 through 7. FIGS. 5 through 7 illustrate example output images in the case where part of the person detecting function is in a detection-unperformable condition.

In the examples of FIGS. 5 through 7, the operating condition determining part 33 determines the operating condition of the person detecting function individually with respect to each of the left-side detection range, the right-side detection range, and the back-side detection range based on input images captured by the left camera 20L, the right camera 20R, and the back camera 20B. Therefore, the operating condition display area G3 is divided into a left operating condition display area G3L, a right operating condition display area G3R, and a back operating condition display area G3B.

The left operating condition display area G3L shows the operating condition of the person detecting function with respect to the left-side detection range, determined based on an input image captured by the left camera 20L. The right operating condition display area G3R shows the operating condition of the person detecting function with respect to the right-side detection range, determined based on an input image captured by the right camera 20R. The back operating condition display area G3B shows the operating condition of the person detecting function with respect to the back-side detection range, determined based on an input image captured by the back camera 20B.

Like the operating condition display area G3 of FIG. 4A, the operating condition display area G3 of FIG. 5 is so placed as to form an arc shape of substantially 270 degrees along the outside outline of the surrounding image area G2, and is trisected into the left operating condition display area G3L, the right operating condition display area G3R, and the back operating condition display area G3B. Furthermore, the left operating condition display area G3L and the right operating condition display area G3R are filled with green, while the back operating condition display area G3B is filled with red. The text display area G4 displays a text message "BACK-SIDE PERSON DETECTION UNPERFORMABLE" to notify the operator of the shovel that it may be impossible to detect a person who enters the back-side detection range. Thus, FIG. 5 illustrates that the operating condition of the person detecting function is a detection-unperformable condition with respect to the back-side detection range because of the contamination image G5 adhering to the lens of the back camera 20B.

The operating condition display area G3 of FIG. 6 is so placed as to extend on three sides, namely, the left side, the right side, and the back side, (to define three sides of a rectangle) of the CG image G1 along the inside outline of the surrounding image area G2, and is divided into the left operating condition display area G3L defining the left side, the right operating condition display area G3R defining the right side, and the back operating condition display area G3B defining the bottom side. Furthermore, the left operating condition display area G3L and the back operating condition display area G3B are filled with green, while the right operating condition display area G3R is filled with red. The text display area G4 displays a text message "RIGHT-SIDE PERSON DETECTION UNPERFORMABLE" to notify the operator of the shovel that it may be impossible to detect a person who enters the right-side detection range. Thus, FIG. 6 illustrates that the operating condition of the person detecting function is a detection-unperformable condition with respect to the right-side detection range because of the contamination image G5 adhering to the lens of the right camera 20R.

The operating condition display area G3 of FIG. 7 is so placed as to fill in the entirety of the outside of the surrounding image area G2 in the output image over the range of substantially 270 degrees along the outside outline of the surrounding image area G2, and is divided into the left operating condition display area G3L, the right operating condition display area G3R, and the back operating condition display area G3B. Furthermore, the back operating condition display area G3B and the right operating condition display area G3R are filled with green, while the left operating condition display area G3L is filled with red. The text display area G4, integrated into the left operating condition display area G3L, displays a text message "LEFT-SIDE PERSON DETECTION UNPERFORMABLE" to notify the operator of the shovel that it may be impossible to detect a person who enters the left-side detection range. Thus, FIG. 7 illustrates that the operating condition of the person detecting function is a detection-unperformable condition with respect to the left-side detection range because of the contamination image G5 adhering to the lens of the left camera 20L.

According to the configuration as described above, the object detecting system 50 can cause the operator of the shovel to intuitively recognize that the detection range of the object detecting system 50 covers three sides, namely, the left side, the right side, and the back side, of the shovel, and can cause the operator of the shovel to recognize whether the operating condition of the person detecting function is a detection-unperformable condition or a detection-performable condition individually with respect to each of the left-side detection range, the right-side detection range, and the back-side detection range of the shovel.

Next, yet another example of the display of the operating condition of the person detecting function is described with reference to FIG. 8. FIG. 8 illustrates an output image including a through-the-lens image area G2B. The through-the-lens image area G2B is a camera image area in which a through-the-lens image generated using only an input image captured with the back camera 20B without performing viewing transformation is displayed.

The operating condition display area G3 of FIG. 8 is composed of a first back operating condition display area G3B1 placed along the upper side of the through-the-lens image area G2B that is a rectilinear portion of its outside outline and a second back operating condition display area G3B2 placed along the lower side of the through-the-lens image area G2B that is a rectilinear portion of its outside outline, either one of which may be omitted.

In the example of FIG. 8, the operating condition of the person detecting function is a detection-unperformable condition with respect to the back camera 20B because of the contamination image G5 adhering to the lens of the back camera 20B. Therefore, the first back operating condition display area G3B1 and the second back operating condition display area G3B2 are filled with red. A text display area, integrated into the first back operating condition display area G3B1, displays a text message "BACK-SIDE PERSON DETECTION UNPERFORMABLE" to notify the operator of the shovel that it may be impossible to detect a person who enters the back-side detection range. Thus, FIG. 8 illustrates that the operating condition of the person detecting function is a detection-unperformable condition with respect to the back-side detection range because of the contamination image G5 adhering to the lens of the back camera 20B.

According to this configuration, even when displaying a through-the-lens image, the object detecting system 50 can reliably cause the operator of the shovel to recognize whether the operating condition of the person detecting function is a detection-unperformable condition or a detection-performable condition.

As described above, the shovel according to the embodiment of the present invention includes the lower traveling body 1, the upper turning body 3 turnably mounted on the lower traveling body 1, a camera attached to the upper turning body 3, the display device 14, and the object detecting unit 20 that detects a predetermined object within a predetermined detection range set around the shovel. The operating condition of an object detecting function using the object detecting unit 20 is displayed on the display device 14. The object detecting unit 20 may be an image capturing device (camera) that captures an image of the surroundings of the shovel or an object detecting sensor such as an ultrasonic sensor, a laser radar sensor, a millimeter wave sensor, a pyroelectric infrared sensor, a bolometer infrared sensor, or an infrared camera. According to this configuration, when it may be impossible to detect an object, it is possible to so inform an operator of the shovel.

An image displayed on the display device 14 includes, for example, a first area and a second area at a position different from the first area. The first area displays, for example, a camera image, and the second area displays, for example, the operating condition of the object detecting function. According to an embodiment, the first area corresponds to the surrounding image area G2, and the second area corresponds to the operating condition display area G3. According to this configuration, the operator of the shovel can recognize whether it may be impossible for the object detecting function to detect an object, by looking at the second area.

The operating condition of the object detecting function includes, for example, a detection-performable condition and a detection-unperformable condition. There is a difference in mode of display between operating conditions of the object detecting function displayed in the second area. The difference in mode of display includes a difference in color, a difference in pattern, a difference between display and non-display, and a difference between lighting and blinking. According to this configuration, the operator of the shovel can easily recognize whether it may be impossible for the object detecting function to detect an object, based on the difference in mode of display of the second area.

An image displayed on the display device 14 includes, for example, a camera image area that displays a camera image. In this case, the display device 14 displays the operating condition of the object detecting function by changing the mode of display of the operating condition display area G3 along part of the outline of the camera image area, for example. Furthermore, the image displayed on the display device 14 may include the CG image G1 that is a computer graphics image of the shovel. In this case, the camera image includes a surrounding image viewing the surroundings of the shovel from above. The length of the operating condition display area G3 along part of the outline of the camera image area represents the width of the detection range. The detection range is desirably is a preset range and is, for example, a space included in the imaging range of the camera. The detection range may alternatively be a space corresponding to the imaging range of the camera or a space within a range of a predetermined distance from the turning axis of the shovel within a space included in the imaging range of the camera. The direction of the operating condition display area G3 viewed from the computer graphics image desirably represents the direction of the detection range relative to the shovel. According to this screen configuration, the operator of the shovel can easily recognize how a detection range is placed around the shovel and in which detection range it may be impossible to detect an object.

In the case where the camera image includes a surrounding image viewing surroundings of the shovel from above, and the length of the operating condition display area G3 along part of the outline of the camera image area represents the width of the detection range as described above, the direction of the operating condition display area G3 viewed from the center of the image displayed on the display device 14 desirably represents the direction of the detection range relative to the shovel. According to this configuration, the operator of the shovel can easily recognize the direction and the width of a set detection range.

The outside outline of the camera image area may include a rectilinear portion as illustrated in FIG. 8, for example. In this case, the operating condition display area G3 is placed along the rectilinear portion of the outside outline of the camera image area (the through-the-lens image area G2B), for example. According to this screen configuration, even when the camera image is a through-the-lens image based on only an input image of a single monocular camera, the operator of the shovel can easily recognize the operating condition of the object detecting function.

The detection range may be composed of multiple partial detection ranges. The partial detection ranges are, for example, the left-side detection range to the left of the shovel, which is a space included in the imaging range CL of the left camera 20L, the back-side detection range at the back of the shovel, which is a space included in the imaging range CB of the back camera 20B, the right-side detection range to the right of the shovel, which is a space included in the imaging range CR of the right camera 20R, etc. In this case, the display device 14 may display the operating condition of the object detecting function individually with respect to each of the multiple partial detection ranges. According to this configuration, the operator of the shovel can recognize whether it may be impossible to detect an object with respect to each detection range.

The shovel according to the embodiment of the present invention may alternatively include the lower traveling body 1, the upper turning body 3 turnably mounted on the lower traveling body 1, a camera attached to the upper turning body 3, the controller 30 that generates an output image from an image captured by the camera, the display device 14 that displays the output image, and a person detecting part configured to detect a person entering a predetermined detection range set around the shovel. The person detecting part is, for example, a camera, an object detecting sensor or the like. According to this configuration, the shovel displays the operating condition of a person detecting function by the person detecting part in the output image. Therefore, the operator of the shovel can recognize whether it may be impossible for the person detecting function to detect a person. According to this configuration as well, the operating condition of the person detecting function includes, for example, a detection-performable condition and a detection-unperformable condition, and the output image includes a first area and a second area at a position different from the first area. The second area displays, for example, the operating condition of the person detecting function. There is a difference in mode of display between operating conditions of the person detecting function displayed in the second area. The difference in mode of display includes a difference in color, a difference in pattern, a difference between display and non-display, and a difference between lighting and blinking. According to this configuration, when it may be impossible to detect a person, it is possible to so inform the operator of the shovel.

The display device 14 may display the operating condition of the object detecting function in text information. This makes it possible for the operator of the shovel to more easily recognize whether it may be impossible for the object detecting function to detect an object.

The edge of the camera image area may include a curving portion. In this case, the operating condition display area G3 may include a curving portion along the edge of the camera image area. For example, the surrounding image area G2 serving as the camera image area may be so placed as to form a partial circle of substantially 270 degrees extending on three sides, namely, the right side, the left side, and the back side, of the CG image G1 as illustrated in FIGS. 4A and 4B, and the operating condition display area G3 may be so placed as to form an arc shape of substantially 270 degrees along the outside outline of the surrounding image area G2. According to this screen configuration, the operator of the shovel can intuitively recognize how much angular range of the surrounding 360 degrees is covered by the detection range.

An embodiment of the present invention is described in detail above. The present invention, however, is not limited to the specific embodiment as described above, and allows variations and modifications within the scope of the present invention described in the claims.

For example, according to the above-described embodiment, each of the left operating condition display area G3L, the right operating condition display area G3R, and the back operating condition display area G3B forms part of the single continuous operating condition display area G3. The present invention, however, is not limited to this configuration. For example, the left operating condition display area G3L, the right operating condition display area G3R, and the back operating condition display area G3B may be independent discontinuous areas.

Furthermore, the shovel, which incorporates the object detecting system 50 according to the above-described embodiment, may incorporate an object detecting system that detects objects other than persons, such as vehicles, work machines, and animals.

Furthermore, the object detecting system 50 may determine the operating condition of the person detecting function individually with respect to each of the left-side detection range, the right-side detection range, and the back-side detection range, based on one or more input images captured by one, two, or four or more cameras.

What is claimed is:

1. A shovel comprising:
   a lower traveling body;
   an upper turning body turnably mounted on the lower traveling body;
   an image capturing device attached to the upper turning body; and
   a display device,
   wherein the shovel has an object detecting function of detecting an object using the image capturing device, and an operating condition of the object detecting function of the shovel is displayed on the display device.

2. The shovel as claimed in claim 1, wherein
   an image displayed on the display device includes a first area and a second area, the second area being at a position different from the first area,
   a captured image is displayed in the first area, and the operating condition of the object detecting function is displayed in the second area.

3. The shovel as claimed in claim 2, wherein
the operating condition of the object detecting function is at least one of a detection preparing condition, a detection-performable condition and a detection-unperformable condition among a plurality of operating conditions,
there is a difference in a mode of display between the plurality of operating conditions of the object detecting function displayed in the second area, and
the difference in the mode of display is at least one of a difference in color, a difference in pattern, a difference between display and non-display, and a difference between lighting and blinking.

4. The shovel as claimed in claim 3, wherein the detection-unperformable condition includes a condition in which there is a possibility of failing to detect a person, said condition being a condition of low visibility due to rain or fog or a condition of low visibility due to insufficient luminance in indoor work or night-time work.

5. The shovel as claimed in claim 2, wherein
the second area is along an outline of the first area.

6. The shovel as claimed in claim 2, wherein
the image displayed on the display device includes a computer graphics image of the shovel,
the captured image includes a surrounding image viewing surroundings of the shovel from above,
a mode of display of the second area is changed in response to a change in the operating condition of the object detecting function,
a length of the second area corresponds to a width of a detection range with respect to the object detecting function, and
a direction of the second area viewed from the computer graphics image of the shovel corresponds to a direction of the detection range with respect to the object detecting function.

7. The shovel as claimed in claim 2, wherein
the captured image includes a surrounding image viewing surroundings of the shovel from above,
a mode of display of the second area is changed in response to a change in the operating condition of the object detecting function,
a length of the second area corresponds to a width of a detection range with respect to the object detecting function, and
a direction of the second area viewed from a center of the image displayed on the display device corresponds to a direction of the detection range with respect to the object detecting function.

8. The shovel as claimed in claim 2, wherein
an edge of the first area includes a rectilinear portion or a curving portion,
a mode of display of the second area is changed in response to a change in the operating condition of the object detecting function, and
the second area is placed along the rectilinear portion or the curving portion of the edge of the first area.

9. The shovel as claimed in claim 2, wherein
an edge of the first area includes a curving portion,
a mode of display of the second area is changed in response to a change in the operating condition of the object detecting function, and
the second area includes a curving portion along the edge of the first area.

10. The shovel as claimed in claim 2, wherein
the captured image includes a surrounding image viewing surroundings of the shovel from above,
the surrounding image includes a new view image portion and a distant view image portion, and is displayed in the first area, and
the second area is placed along the distant view image portion.

11. The shovel as claimed in claim 2, wherein
the object detecting function is correlated with each of a plurality of imaging ranges corresponding to a plurality of cameras serving as the image capturing device, and
when an image captured by one of the plurality of cameras is displayed, the second area is placed outside at least one of an upper side and a lower side of the displayed image captured by the one of the plurality of cameras.

12. The shovel as claimed in claim 2, wherein
the captured image includes a surrounding image viewing surroundings of the shovel from above, and
the second area is placed inside the surrounding image.

13. The shovel as claimed in claim 1, wherein
a detection range with respect to the object detecting function is composed of a plurality of partial detection ranges, and
the display device displays the operating condition of the object detecting function individually with respect to each of the plurality of partial detection ranges.

14. The shovel as claimed in claim 1, further comprising:
a controller configured to generate an output image from an image captured by a camera serving as the image capturing device, and
a person detecting part configured to detect a person entering a predetermined detection range set around the shovel,
wherein an operating condition of a person detecting function by the person detecting part is displayed in the output image displayed on the display device.

15. The shovel as claimed in claim 1, wherein the display device displays the operating condition of the object detecting function in text information or an icon image.

16. The shovel as claimed in claim 1, wherein the operating condition of the object detecting function is determined based on an image captured by a camera serving as the image capturing device, information obtained by a sensor that is different from the camera, or the image captured by the camera and the information obtained by the sensor.

17. The shovel as claimed in claim 1, wherein
the object detecting function is a function to detect a predetermined object within a predetermined detection range set around the shovel, and
the predetermined detection range is a range reachable by a bucket or a range of a predetermined distance from a turning axis of the shovel.

18. The shovel as claimed in claim 1, wherein
an image displayed on the display device includes a first area and a second area, the second area being at a position different from the first area,
at least two operating conditions of the object detecting function are displayed in the second area,
there is a difference in a mode of display between the at least two operating conditions of the object detecting function displayed in the second area, and
the difference in the mode of display is at least one of a difference in color, a difference in pattern, and a difference between lighting and blinking.

19. The shovel as claimed in claim 1, further comprising:
a hardware processor configured to determine the operating condition of the object detecting function,
wherein the determined operating condition of the object detecting function is displayed on the display device.

20. The shovel as claimed in claim 1, wherein the operating condition of the object detecting function indicates a possibility of not being able to detect the object using the image capturing device.

\* \* \* \* \*